W. N. STEWART.
VEHICLE PROPELLED BY A COMBINATION OF ELECTRICAL AND MECHANICAL POWER.
APPLICATION FILED JAN. 19, 1909.
1,065,982.
Patented July 1, 1913.
2 SHEETS—SHEET 1.
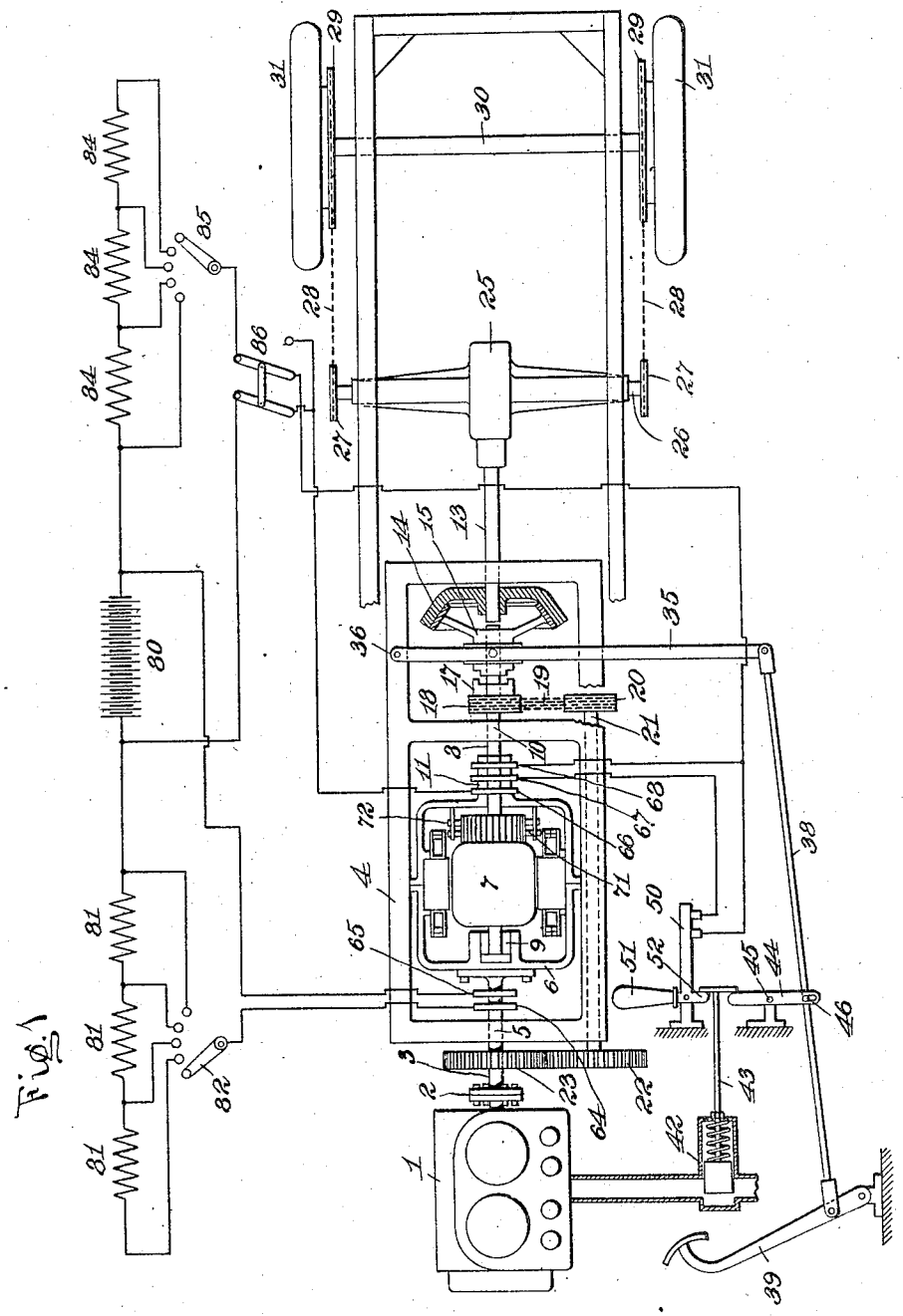

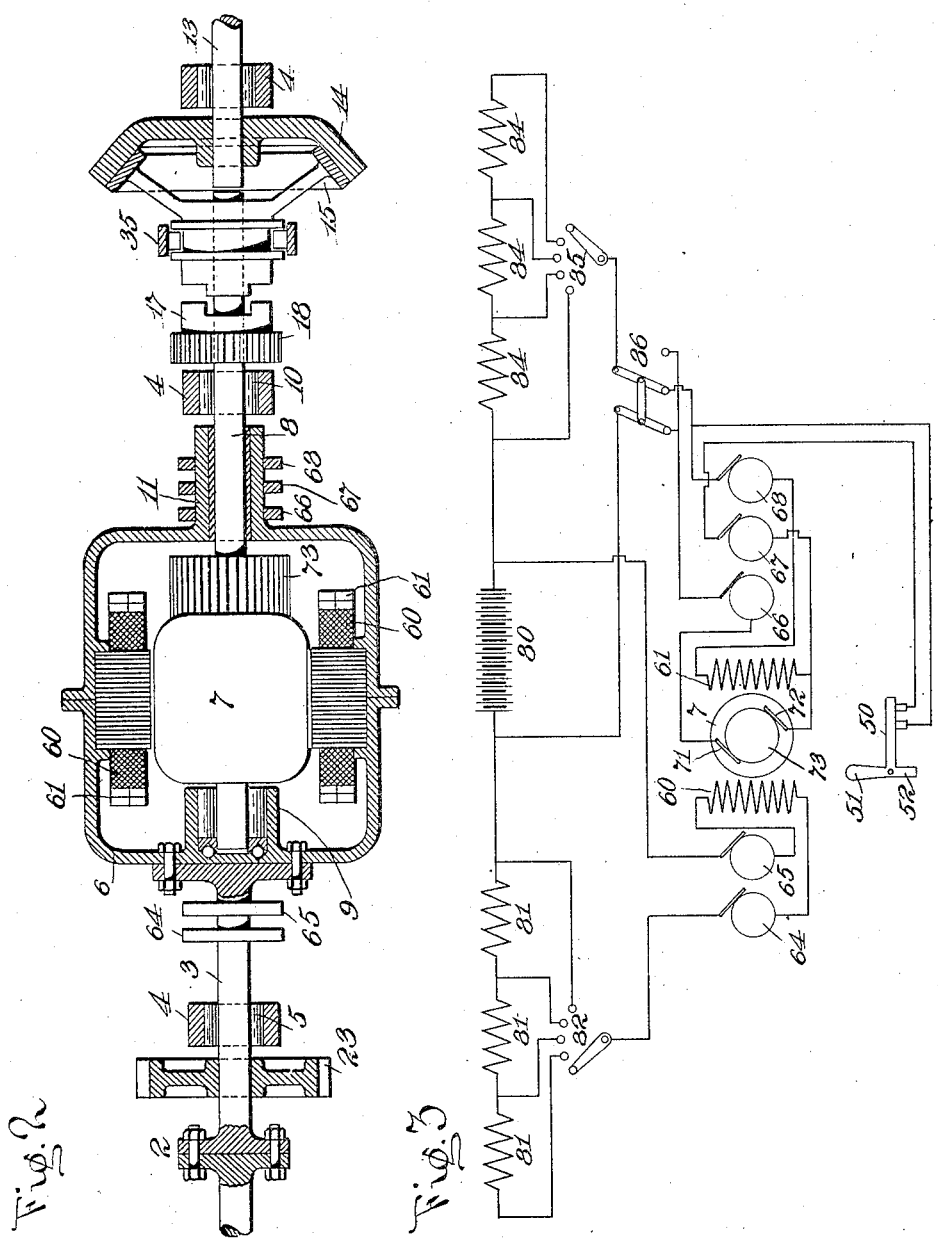

UNITED STATES PATENT OFFICE.

WILLIS N. STEWART, OF LONDON, ENGLAND, ASSIGNOR OF ONE-HALF TO FRANK HARRIS, OF LONDON, ENGLAND.

VEHICLE PROPELLED BY A COMBINATION OF ELECTRICAL AND MECHANICAL POWER.

1,065,982.

Specification of Letters Patent.

Patented July 1, 1913.

Application filed January 19, 1909. Serial No. 473,143.

*To all whom it may concern:*

Be it known that I, WILLIS NELSON STEWART, a subject of the King of Great Britain, residing at London, England, have invented new and useful Improvements in or Relating to Vehicles Propelled by a Combination of Electrical and Mechanical Power, of which the following is a specification.

My invention relates to vehicles driven by a combination of electrical and mechanical power, and has for its general object the provision of an arrangement which is efficient and reliable in operation, and which permits easy regulation of speed.

To the above end my invention, in its preferred form, comprises a prime mover which normally drives the rotatable field structure of a dynamo electric machine, the armature of which is geared to the driving wheels of the vehicle: the current for the fields and armature of the dynamo electric machine being furnished from a storage battery or other suitable source of current; and suitable controlling means being provided for regulating the excitation of said fields and armature and for regulating also the power of the prime mover, if desired, under different conditions of load. In addition, I have provided means whereby a storage battery, if used, can be charged from the dynamo electric machine driven as a generator by the prime mover.

My invention will be fully understood, and the advantages thereof will appear, from the following specification which, when taken in connection with the accompanying drawings, sets forth one form in which said invention may be embodied.

In the drawings, Figure 1 is a diagrammatic representation of a vehicle having my invention embodied therein; Fig. 2 is a plan view partly in section of the dynamo electric machine and certain parts coöperating therewith, illustrating the details of construction; and Fig. 3 is a diagram illustrating the electrical circuits of the arrangement shown in Figs. 1 and 2.

Like parts are referred to throughout the drawings by the same reference characters.

The vehicle is provided with a suitable prime mover such as a gas engine 1. This engine is connected through a coupling 2 and a shaft 3 to the rotating field member of a dynamo electric machine which is supported in a suitable frame 4. The shaft 3 is shown as journaled in a suitable bearing 5 in the frame 4, and said shaft has connected thereto the field frame 6 of the dynamo electric machine, which may be of the form indicated in the drawings. The armature of the dynamo electric machine is indicated at 7 and the shaft 8 thereof is supported in a bearing 9 in the field frame 6 and in a bearing 10 in the frame 4; and the field frame 6, at the end opposite from that in which the end of the shaft 8 is journaled, is journaled upon the shaft 8 as shown at 11. The shaft 8 is connected to the main driving shaft 13, through a clutch having a member 14 secured to the end of the shaft 13 and a coöperating movable member 15 keyed to but slidingly arranged upon the shaft 8. The movable member 15 also coöperates with a clutch member 17 rotatably mounted on the shaft 8 and provided with a sprocket wheel 18 which is connected by a sprocket chain 19 with a sprocket wheel 20 on a shaft 21 journaled in the frame 4 and carrying at its other end a gear 22 which meshes with a gear 23 secured to the shaft 3 and driven thereby. With this arrangement, when the movable clutch member 15 is in the position shown in Fig. 1, the armature shaft 8 is connected to the main driving shaft 13; and when the clutch member 15 is in its other position, the armature shaft 8 is disconnected from the main shaft 13 and is connected through the sprocket wheel 18, chain 19, sprocket wheel 20, shaft 21 and gears 22 and 23 to the shaft of the prime mover 1. It is to be noted that this gearing is such that the field structure 6 of the dynamo electric machine and the armature 7 thereof will be driven by the prime mover in opposite directions. The main driving shaft 13 is connected through differential gearing 25, shaft 26, sprocket wheels 27, sprocket chains 28 and sprocket wheels 29, to the driving axle 30, carrying the wheels 31. The movable member 15 of the clutch, is operated by a lever 35 pivoted at 36 to the frame 4 and having its other end connected by a rod 38 to a pedal 39 located within the reach of the operator.

The supply of fuel to the gas engine 1 is partially controlled by controlling means such as a throttle or supply valve 42 of any suitable form which normally stands partly open as indicated in the drawing. The operating element 43 of this valve is operatively connected to the pedal 39 in any suitable manner, as for example by means of the lever 44, pivoted at 45 and arranged to engage at one end the rod 43 and at the other end a pin 46 on the rod 38. With this arrangement, pressing of the pedal 39 to throw the clutch from the position shown in Fig. 1 to its other position, will result in further opening the throttle valve 42. Said throttle valve may also be similarly opened by manipulation of a switch 50 (hereinafter referred to) having a handle 51 and a lug 52 which coöperates with the end of the valve rod 43, as shown.

The electrical connection of the dynamo electric machine will be understood from an examination of Figs. 1 and 3. The field frame 6 of the dynamo electric machine has coils 60 and coils 61. Mounted upon the shaft 3, and insulated therefrom, are slip rings 64 and 65; mounted on the cylindrical extension forming part of the journal 11 at the right end of the field structure 5, and insulated therefrom, are slip rings 66, 67 and 68; and mounted on the field frame 5 in any suitable manner, are brushes 71 and 72, which coöperate with the commutator 73 of the armature 7. The terminals of the field windings 60 are connected to the slip rings 64 and 65; the brushes 71 and 72 are connected respectively to the slip rings 66 and 67; and the terminals of the field windings 61 are connected to the slip rings 67 and 68. The vehicle is provided with a suitable source of current such as a storage battery 80. The brushes which coöperate with the slip rings 64 and 65 are connected to the terminals of the battery 80 through a rheostatic controller comprising resistant sections 81 and a switch 82 which controls the amount of resistance in the circuit. The brushes which coöperate with the slip rings 66 and 68 are connected across the battery through a rheostatic controller comprising resistant sections 84 and a switch 85 which controls the amount of resistance in the circuit, a reversing switch 86 being provided to control the direction of current in said circuit. The brushes which coöperate with the slip rings 67 and 68 are electrically connected through the switch 50, hereinbefore mentioned.

With the arrangement of circuits above described, it is obvious that the field winding 60 is excited from the storage battery, and that the field windings 61 are short circuited by the switch 50 when the latter is closed. Under normal operation, the engine 1 drives the field structure of the dynamo electric machine which acts as a motor deriving its current from the battery 80. The consumption of current in the dynamo electric machine will, however, be low owing to the fact that the rotation of the field structure, in a direction opposite to that in which the armature rotates, produces a high counter-electromotive force with consequent low current value in the armature circuit.

When operating in a forward direction, the starting and stopping of the vehicle is effected by closing and opening the armature circuit by means of the switch 85; and the speed of the vehicle is regulated by controlling the field and armature excitation by means of the switches 82 and 85. In starting, climbing hills, or when for any other reason the engine is heavily loaded, the switch 50 should be opened, thereby opening the short circuit around the field 61 and throwing the latter into use, and at the same time further opening the throttle valve 42 and increasing the supply of fuel to the engine. When it is desired to back the vehicle, the engine is stopped; and, after the reversing switch 86 has been thrown to the proper position, the switch 85 is manipulated and the armature is excited by current in a direction opposite to that flowing during forward operation, the switch 50 being left closed, and the field strength being regulated by the switch 82. When the vehicle exceeds a certain speed in going down hill, the armature may be driven at such a high speed that the counter-electromotive force of the dynamo electric machine will exceed the voltage of the battery and current will be returned to the battery and the latter thereby charged. When it is desired to charge the storage battery, for example when the vehicle is standing still and the engine is running, the operator by depressing the pedal 39 can throw the clutch member 15 out of engagement with the clutch member 14 and into engagement with the clutch member 17, thereby disconnecting the armature from the shaft 13 and connecting the armature to the engine 1, in the manner above mentioned; at the same time, the throttle valve 42 is further opened to increase the supply of fuel to the engine and allow the latter to handle the increased load thrown upon it.

With the above described arrangement, it is obvious that, if for any reason the prime mover should become disabled, the vehicle can still be run by blocking in fixed position the shaft 3 or the rotating field structure 6, and then operating the dynamo electric machine solely as a motor—receiving its current from this storage battery.

What I claim is:—

1. In combination, a prime mover; a mechanism to be driven; a dynamo electric machine having both elements thereof rotatable and one of said elements connected to said prime mover; and means for connecting the other element of said dynamo electric machine to either the mechanism to be driven or said prime mover.

2. In combination, a prime mover; a mechanism to be driven; a dynamo electric machine having both elements thereof rotatable and one of said elements connected to said prime mover; and gearing including a clutch mechanism for connecting the other element of said dynamo electric machine to either the mechanism to be driven or the prime mover.

3. In combination, a prime mover; a mechanism to be driven; a dynamo electric machine having both elements thereof rotatable and one of said elements connected to said prime mover; and gearing including a clutch mechanism for connecting the other element of the dynamo electric machine to either the mechanism to be driven or the prime mover for rotation in the opposite direction from that in which said prime mover drives the other element of the dynamo electric machine.

4. In combination, a prime mover; controlling means therefor; a mechanism to be driven; a dynamo electric machine having both elements thereof rotatable and one of said elements connected to said prime mover; and means for simultaneously actuating said controlling means for the prime mover and connecting the other element of the dynamo electric machine to either the mechanism to be driven or said prime mover.

5. In a vehicle propelled by electrical and mechanical power, the combination of a prime mover; field magnets rotated by said prime mover; an armature; a storage battery for energizing said armature normally to produce rotation thereof in a direction reverse to that of the field magnets; a driving shaft and suitable mechanism for the driving of the vehicle; gearing between the prime mover and said armature; and a double acting clutch which in one position connects the armature with said driving shaft and in another position connects the armature with said gearing.

6. In a vehicle propelled by electrical and mechanical power, the combination of a prime mover; field magnets rotated by said prime mover; an armature; a storage battery for energizing said armature and said field magnets; a driving shaft and mechanism for driving the vehicle; gearing between the prime mover and said armature; a double-acting clutch which in one position connects said armature with said driving shaft and in another position connects said armature with said gearing; a controlling device for said prime mover; and means for simultaneously actuating said clutch and said controlling device.

7. In a vehicle propelled by electrical and mechanical power, the combination of a prime mover; field magnets rotated by said prime mover; said magnets having two separate windings; an armature; a storage battery for furnishing current to said field magnets and said armature; a driving shaft and mechanism for driving the vehicle; gearing between said prime mover and said armature; a double-acting clutch which in one position connects said armature with said driving shaft and in another position connects said armature with said gearing; a controlling device for the prime mover; means for simultaneously actuating said clutch and said controlling device; and means actuated by the first named means, for simultaneously controlling one of the field windings.

8. In a vehicle propelled by electrical and mechanical power, the combination of a prime mover; field magnets rotated by said prime mover; an armature; a storage battery for furnishing current to said field magnets and said armature; a driving shaft and suitable mechanism for driving the vehicle; a counter-shaft geared to said prime mover; and gearing including a double-acting clutch which in one position connects said armature with said driving shaft and in the other position connects said armature with said counter-shaft.

In witness whereof I have hereunto set my hand in presence of two witnesses.

W. N. STEWART.

Witnesses:
WM. GIRLING,
H. D. JAMESON.

Copies of this patent may be obtained for five cents each, by addressing the "Commissioner of Patents, Washington, D. C."